Patented Oct. 27, 1936

2,058,899

UNITED STATES PATENT OFFICE 2,058,899

VISCOUS LIQUID FOR USE IN SHOCK ABSORBERS

George L. Matheson, Elizabeth, N. J., assignor to Standard Oil Development Company, a corporation of Delaware No Drawing. Application December 1, 1932, Serial No. 645,277

2 Claims. (Cl. 196—149)

This invention relates to improved viscous fluids and methods of making same and it relates more particularly to the preparation of viscous fluids suitable for use in shock absorbers and the like.

One of the main objections to the various materials which have been used heretofore in hydraulic shock absorbers and other types of equipment which depend for their success on the viscosity of a fluid is that the viscosity changes greatly with the temperature. This causes a change in action whenever there is much of a change in temperature.

One object of the present invention is to overcome the above objection by preparing a fluid in which the change in viscosity, accompanying change in temperature, is relatively low and is considerably lower than in fluids used heretofore for such purposes. In other words, the invention contemplates preparing a fluid having a more nearly uniform viscosity over a relatively wide range in temperature.

Another object of the invention is to make it possible to prepare fluids having any desired viscosity and yet in a simple and economical manner.

Broadly, the invention comprises the addition of a viscous or plastic hydrocarbon polymer to an oil of low viscosity. It is preferable that the polymer to be used should itself have a very high viscosity and a relatively high viscosity index, meaning a relatively low change in viscosity when the fluid is heated from 100° F. to 210° F. and at the same time be soluble in the oil to be used. I have found that by blending various amounts of such a polymer with a light oil of low viscosity and preferably high viscosity index, practically any desired viscosity may be obtained, while at the same time having a relatively high viscosity index for the finished blended liquid.

For the sake of illustration, although not desiring to be limited thereby several examples will be given:

A light Pennsylvania oil is blended with various percentages of a colorless viscous or plastic hydrocarbon material obtained by polymerizing various unsaturated hydrocarbons in the presence of a volatile halide catalyst. One such product is obtained by polymerizing isobutylene at low temperature (about −10° C.) in the presence of boron fluoride. This polymer is a tough viscous semi-elastic almost colorless plastic mass having a fairly high molecular weight, say from 800 up depending upon the degree of polymerization. In blending this material with samples of Pennsylvania oil of various viscosities, the following properties are obtained:

Table showing viscosity at 100° F. corresponding to viscosity of 75 seconds at 210° F.

| Base oil | | | Percent polymer added | Blend | | |
|---|---|---|---|---|---|---|
| Viscosity at | | Viscosity index | | Viscosity at | | Viscosity index |
| 100° F. | 210° F. | | | 100° F. | 210° F. | |
| 700 | 75 | 100 | 0 | 700 | 75 | 100 |
| 500 | 62 | 90 | 1 | 630 | 75 | 109 |
| 200 | 42 | Below 0 | 3 | 500 | 75 | 123 |
| 130 | 30 | Below 0 | 5 | 400 | 75 | 132 |

This table shows that a Pennsylvania oil having a viscosity of 75 seconds at 210° F. has a viscosity of 700 seconds at 100° F. Now if it is desired to keep the 75 seconds viscosity at 210° F. but obtain a lower viscosity at 100° F. then a much lighter Pennsylvania oil is selected, (say one having a viscosity of about 30 seconds at 210° F. and about 130 seconds at 100° F.), and to this light oil, according to this invention, viscous polymer is added until the viscosity at 210° F. is raised from 30 seconds to 75 seconds. The blend containing the polymer now has a viscosity of 400 seconds at 100° F. compared to 700 seconds for the natural oil without any polymer and the table shows that 5% of the polymer was used. The table also shows the corresponding effect on the viscosity index of those same blends.

Similarly, other types of oil may be used instead of Pennsylvania oil, for example, Mid-Continent, Coastal, etc. The above table showing experimental results is not intended to limit the viscosity of the base oil that can be used as that can vary from the lightest non-volatile fluids such as kerosene gas oil, etc., up to fluids of the range of heavy lubricating oil; nor to limit the percentage of polymer that may be used, for with lighter fluids very large additions can be made, such as 10%, 20%, or even 50% or more, depending on the desired viscosity characteristics of the finished blend.

As the viscosity appears to be almost an exact logarithmic function of the percentage of polymer added, a liquid having better viscosity and viscosity index characteristics than any natural oil can be prepared at will by proper selection of the kind and amount of polymer and the type of oil or other fluid with which it is blended. For instance, in extreme cold climates and for aviation purposes it will usually be found desirable to use an oil or similar substance having a very low pour point and low viscosity and bring it up to the desired viscosity by the addition of relatively large amounts of polymer, whereas in warm climates an oil can be used having a considerably higher pour point and higher viscosity, in this case requiring less polymer to bring the blend up to the desired viscosity. However, the composition suggested for cold climates is also satisfactory for warm climates and so can be used as an all-season and all-climate material. In most cases, regardless of temperature, it is preferable to use an oil for the blending which has as high a viscosity index as possible. The addition of hydrocarbon polymer prepared in accordance with this invention will improve the viscosity index of even the best of the natural oils.

Although one particular method has been explained for the preparation of a suitable hydrocarbon polymer, the invention is not limited thereto. Other hydrocarbons for example diolefines such as butadiene and isoprene and aromatic hydrocarbons such as styrene, indene and the like, may be polymerized to produce a viscous mass having the general properties stated. These products have the additional advantage that they are stable under ordinary conditions and will not deteriorate with age as is the tendency with various other materials used heretofore for like purposes. All of the above materials are polymers of the aliphatic chain type rather than the asphaltic or ring type. That is to say the polymers are formed by lining up in substantially straight lines with the minimum of branching and with substantially no ring formation. All of the above polymers are found to be very effective thickeners and relatively small amounts produce substantial increases in viscosity. They are clear, light colored and very viscous and might be termed plastic solids rather than liquids. They show some elastic properties but in this respect are not comparable with rubber.

Although a light mineral oil has been mentioned as a desirable material with which to blend the polymer for producing shock absorber fluids, the invention can also be carried out by using other fluids such as animal or fish oils such as menhadin, or vegetable oils such as linseed, or any other materials which would be durable under the conditions of use and in which the polymer is soluble. The use of mutual solvents to increase the solubility of the polymer in liquids in which the polymer itself is relatively insoluble, comes within the purview of the invention.

The description of the above mentioned compositions as being particularly applicable for use in shock absorbers is not intended to limit the invention to such a use, for viscous fluids such as those described above, as well as others which may be prepared in accordance with the above specification, are useful for other purposes such as vibration dampeners and various instruments and equipment which depend for their successful operation on the resistance to flow which a viscous fluid offers.

I do not desire to be limited to any specific illustration of the invention given as there may be relatively wide variation in the kinds and proportions of the materials used without departing from the broader scope of the invention and I desire to be limited only by the following claims in which it is my intention to claim all novelty as broadly as the prior art permits.

I claim:

1. A viscous liquid for use in shock absorbers, vibration dampeners, and instruments which depend for their successful operation on the resistance to flow offered by a viscous fluid, comprising a viscous hydrocarbon oil blend, having a viscosity index above about 109, said blend containing a major portion of a petroleum oil having a volatility not greater than that of kerosene, having a viscosity index less than 100 and being relatively less viscous than said blend, and a minor portion of an aliphatic chain type hydrocarbon polymer of above about 800 molecular weight dissolved in said oil.

2. A liquid according to claim 1 in which said petroleum oil has a viscosity index less than zero.

GEORGE L. MATHESON.